(12) United States Patent
Chen et al.

(10) Patent No.: US 8,819,630 B2
(45) Date of Patent: Aug. 26, 2014

(54) AUTOMATIC TEST TOOL FOR WEBPAGE DESIGN WITH MICRO-BROWSERS ON MOBILE PLATFORMS

(75) Inventors: Chih-Yung Chen, Taipei (TW); Shu-Fong Huang, Taipei (TW); Ellen Huang, Taipei (TW)

(73) Assignee: Microsoft Corporation, Redmond, WA (US)

( * ) Notice: Subject to any disclaimer, the term of this patent is extended or adjusted under 35 U.S.C. 154(b) by 1136 days.

(21) Appl. No.: 12/329,647

(22) Filed: Dec. 8, 2008

(65) Prior Publication Data
US 2010/0146488 A1  Jun. 10, 2010

(51) Int. Cl.
*G06F 9/44* (2006.01)

(52) U.S. Cl.
USPC .............................. 717/124; 717/127; 717/128

(58) Field of Classification Search
None
See application file for complete search history.

(56) References Cited

U.S. PATENT DOCUMENTS

| | | | |
|---|---|---|---|
| 5,412,389 A * | 5/1995 | Olds ........................ | 342/357.21 |
| 6,044,398 A * | 3/2000 | Marullo et al. ............... | 709/219 |
| 6,609,150 B2 | 8/2003 | Lee et al. | |
| 6,701,514 B1 * | 3/2004 | Haswell et al. ............... | 717/115 |
| 6,725,399 B1 * | 4/2004 | Bowman .................... | 714/38.14 |
| 6,799,147 B1 * | 9/2004 | Balasubramanian et al. | 717/127 |
| 6,918,066 B2 * | 7/2005 | Dutta et al. ..................... | 714/46 |
| 7,072,984 B1 | 7/2006 | Polonsky et al. | |
| 7,143,437 B2 * | 11/2006 | Royer et al. ........................ | 726/8 |
| 7,277,827 B2 * | 10/2007 | Shapiro et al. ................ | 717/124 |
| 7,299,451 B2 * | 11/2007 | Dygon et al. .................. | 717/124 |
| 7,308,689 B2 * | 12/2007 | Black et al. .................... | 719/318 |
| 7,330,887 B1 * | 2/2008 | Dharmadhikari ............. | 709/224 |
| 7,392,510 B1 * | 6/2008 | Treder et al. ................... | 717/128 |
| 7,421,679 B2 | 9/2008 | Hansen et al. | |
| 7,447,997 B2 * | 11/2008 | Colle ............................. | 715/764 |
| 7,627,813 B2 * | 12/2009 | Roser ............................. | 715/234 |
| 7,757,175 B2 * | 7/2010 | Miller ............................. | 715/738 |
| 7,979,849 B2 * | 7/2011 | Feldstein et al. ............... | 717/128 |
| 8,006,231 B2 * | 8/2011 | Peipelman et al. ............ | 717/124 |
| 8,359,581 B2 * | 1/2013 | Ortiz ............................. | 717/128 |
| 8,392,890 B2 * | 3/2013 | Miller ............................ | 717/127 |
| 8,434,068 B2 * | 4/2013 | Wrighton et al. ............. | 717/124 |
| 8,495,585 B2 * | 7/2013 | Miller ............................ | 717/127 |

(Continued)

OTHER PUBLICATIONS

CookyNetwork, "Internet explorer: A History", unknown publication date, published online; [retrieved on Apr. 24, 2012]; Retrieved from Internet <URL:http://www.richardcook.info/?p=617>;pp. 1-9.*

(Continued)

*Primary Examiner* — Tuan Dam
*Assistant Examiner* — Xi D Chen
(74) *Attorney, Agent, or Firm* — Jim Ross; Leonard Smith; Micky Minhas

(57) ABSTRACT

Architecture that provides a convenient and effective test tool for testing and ensuring that webpages using micro-browsers are sufficiently designed and operational. A task library is developed for manipulating browsers on a handheld device, and includes one or more seamless methods that operate the different browsers in the same way. Seamless virtual functions that manipulate different micro-browsers include, but are not limited to browser launch, exiting a browser, navigating to a home page, clearing a cache, navigating to a webpage, reloading a webpage, getting the current info for a webpage, navigating back to a webpage, checking a page title, and capturing a screen, for example. Device features can also be manipulated to ensure consistency across the testing process.

20 Claims, 11 Drawing Sheets

(56) References Cited

U.S. PATENT DOCUMENTS

| | | | |
|---|---|---|---|
| 8,543,983 B2* | 9/2013 | Murthy | 717/127 |
| 8,566,648 B2* | 10/2013 | Schroeder | 717/124 |
| 2004/0030741 A1* | 2/2004 | Wolton et al. | 709/202 |
| 2004/0103394 A1* | 5/2004 | Manda et al. | 717/126 |
| 2004/0162874 A1* | 8/2004 | Woo et al. | 709/203 |
| 2005/0015726 A1 | 1/2005 | Tuominen | |
| 2005/0177597 A1* | 8/2005 | Elmer | 707/104.1 |
| 2005/0188357 A1* | 8/2005 | Derks et al. | 717/124 |
| 2005/0240841 A1* | 10/2005 | Lin | 717/124 |
| 2006/0101403 A1* | 5/2006 | Sharma et al. | 717/124 |
| 2008/0072139 A1* | 3/2008 | Salinas et al. | 715/238 |
| 2008/0127095 A1* | 5/2008 | Brennan et al. | 717/124 |
| 2009/0077171 A1* | 3/2009 | Kasha | 709/203 |
| 2009/0083714 A1* | 3/2009 | Kiciman et al. | 717/128 |
| 2009/0249216 A1* | 10/2009 | Charka et al. | 715/744 |
| 2010/0030626 A1* | 2/2010 | Hughes et al. | 717/128 |
| 2010/0251217 A1* | 9/2010 | Miller | 717/126 |
| 2010/0325615 A1* | 12/2010 | Ramot | 717/124 |

OTHER PUBLICATIONS

Kung, et al., "An Object-Oriented Web Test Model for Testing Web Applications", 2000 IEEE; [retrieved on Apr. 23, 2012]; Retrieved from Internet <URL:http://ieeexplore.ieee.org/stamp/stamp.jsp?tp=&arnumber=883784>;pp. 111-120.*

RadView, "WebLOAD User's Guide", 2007, published online; [retrieved on Apr. 23, 2012]; Retrieved from Internet <URL:http://www.webloadmpstore.com/media/WebLOAD_Console_Guide.pdf>; pp. 1-436.*

Unknown author, "Manually clearing your Internet Explorer 6 browser's cache"; Mar. 27, 2007, published online; [retrieved on Apr. 24, 2012]; Retrieved from Internet <URL:http://www.sfs.opm.gov/ClearCacheIE.pdf>;pp. 1-5.*

Artzi, et al., "Finding Bugs in Dynamic Web Applications", 2008, ACM; [retrieved on Feb. 4, 2014]; Retrieved from Internet <URL:http://dl.acm.org/citation.cfm?id=1390630>; pp. 1-11.*

Yang, et al., "A Unified Platform for Data Driven Web Applications with Automatic Client-Server Partitioning"; 2007, ACM; [retrieved on Feb. 4, 2014]; Retrieved from Internet <URL:http://dl.acm.org/citation.cfm?id=1242572>; pp. 341-350/.*

Mesbah, Prasad, "Automated Cross-Browser Compatibility Testing", 2011, ACM; [retrieved on Feb. 4, 2014]; Retrieved from Internet <URL:http://ieeexplore.ieee.org/stamp/stamp.jsp?tp=&arnumber=6032495>; pp. 361-370.*

Choudhary, et al., "A Cross-browser Web Application Testing Tool", 2010 IEEE; [retrieved on Feb. 4, 2014]; Retrieved from Internet <URL:http://ieeexplore.ieee.org/stamp/stamp.jsp?tp=&arnumber=5609728>; pp. 1-6.*

Hess, Arne, "Wireless: Java Programmable Micro-Browser for PDAs & Smarphones", Retrieved at http://www.theunwired.net/?item=wireless-java-programmable-micro-browser-for-pdas-smarphones>>, Nov. 8, 2001, pp. 2.

"Dynamic User Interface for Mobiles", Retrieved at <<http://www.3g.co.uk/PR/July2003/5567.htm>>, Jul. 2, 2003, pp. 3.

Motsi, Harma, "Wireless Applications for Virtual Communities of Practice", Retrieved at <<http://libserv5.tut.ac.za:7780/p1s/eres/wpg_docload.download_file?p_filename=F197702203/motsi.pdf>>, Nov. 2004, pp. 194.

Schaefer, et al., "Fuzzy Rules for HTML Transcoding", Retrieved at <<http://csdl2.computer.org/comp/proceedings/hicss/2002/1435/03/14350081.pdf>>, Proceedings of the 35th Hawaii International Conference on System Sciences—2002, pp. 9.

"Some Basics about Wireless (WML and XHTML Mobile)", Originally retrieved at <<http://web.simmons.edu/~benoit/LIS469/WMLnotes.pdf>>, originally accessed on Sep. 25, 2008, currently retrievable at <<http://www.pdfio.com/k-400228.html>>, believed to be originally posted Mar. 2006, 7 pages.

* cited by examiner

AUTOMATIC TEST TOOL FOR WEBPAGE DESIGN WITH MICRO-BROWSERS ON MOBILE PLATFORMS

BACKGROUND

When developing the mobile page view for a website, the page display result should be checked on micro browsers of handheld devices (e.g., mobile phones) having small displays to ensure viewing quality of the webpages. However, there is no efficient way to run the test pass on all webpages against different browsers. Currently, the test pass is performed manually and the result is confirmed with visual inspection, for example, when installing a third-party browser on a mobile device and launching the browser to navigate the mobile webpage on website. In other words, in order to check the new developing mobile page, the page URL link is input manually with the device keypad, and the result confirmed visually, which is time consuming, and with no efficacy.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture includes a test tool that leverages an existing mobile test framework to test webpages for viewing on small displays and associate presentation applications (e.g., browsers). A task library is developed for manipulating browsers on a handheld device. The task library provides one or more seamless methods to operate the different browsers in the same way. Based on the task library, the test tool can write test scripts on webpage result verification without concern about the differences that can exist between browsers. The test tool facilitates a complete test pass on small devices with efficacy.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
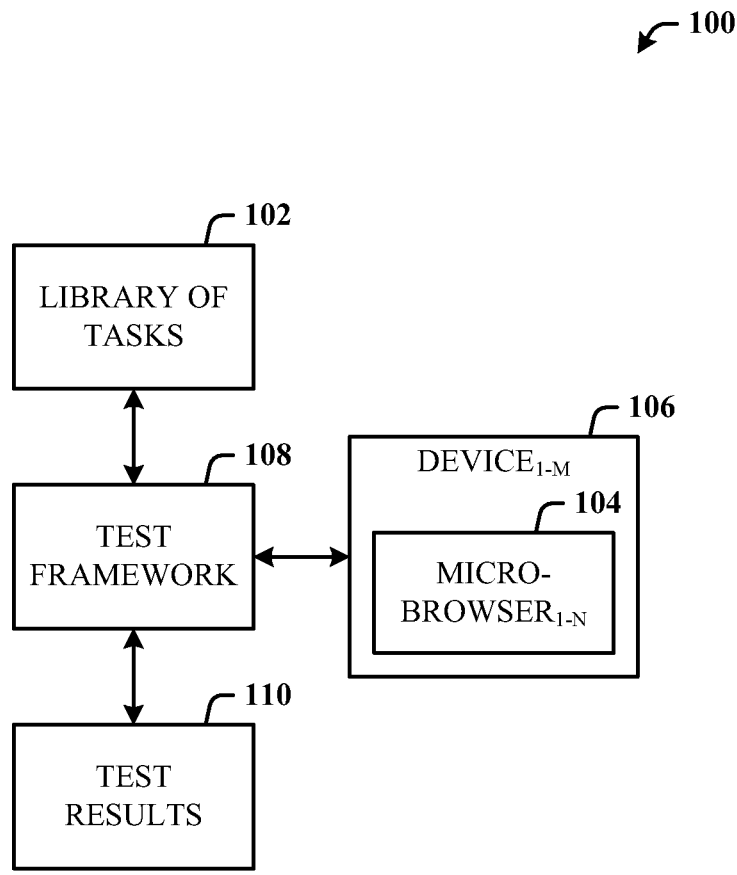
FIG. 1 illustrates a computer-implemented test system in accordance with the disclosed architecture.

The disclosed architecture provides a convenient and effective test tool for testing and ensuring that webpages using micro-browsers, for example, are sufficiently designed and operational. A task library is developed for manipulating browsers on a handheld device, includes one or more seamless methods that operate the different browsers in the same way. Seamless virtual functions that manipulate different micro-browsers include, but are not limited to browser launch, exiting a browser, navigating to a home page, clearing a cache, navigating to a webpage, reloading a webpage, getting the current info for a webpage, navigating back to a webpage, checking a page title, and capturing a screen, for example.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented test system 100 in accordance with the disclosed architecture. The system 100 includes a library of tasks 102 for controlling different micro-browsers 104 (denoted Micro-Browser$_{1-N}$) when running on different handheld web-accessible devices 106 (denoted Device$_{1-M}$). The system 100 also includes a test framework 108 for executing the tasks to test display of a webpage in the different micro-browsers 104 when operating on the handheld web-accessible devices 106.

The library of tasks 102 includes tasks that launch a micro-browser and exit the micro-browser, that navigate to a home webpage, navigate to a particular webpage, and navigate back to a previous webpage, reload a webpage, clear a cache, get current information, check a webpage title, and capture a screen.

Figure 2:
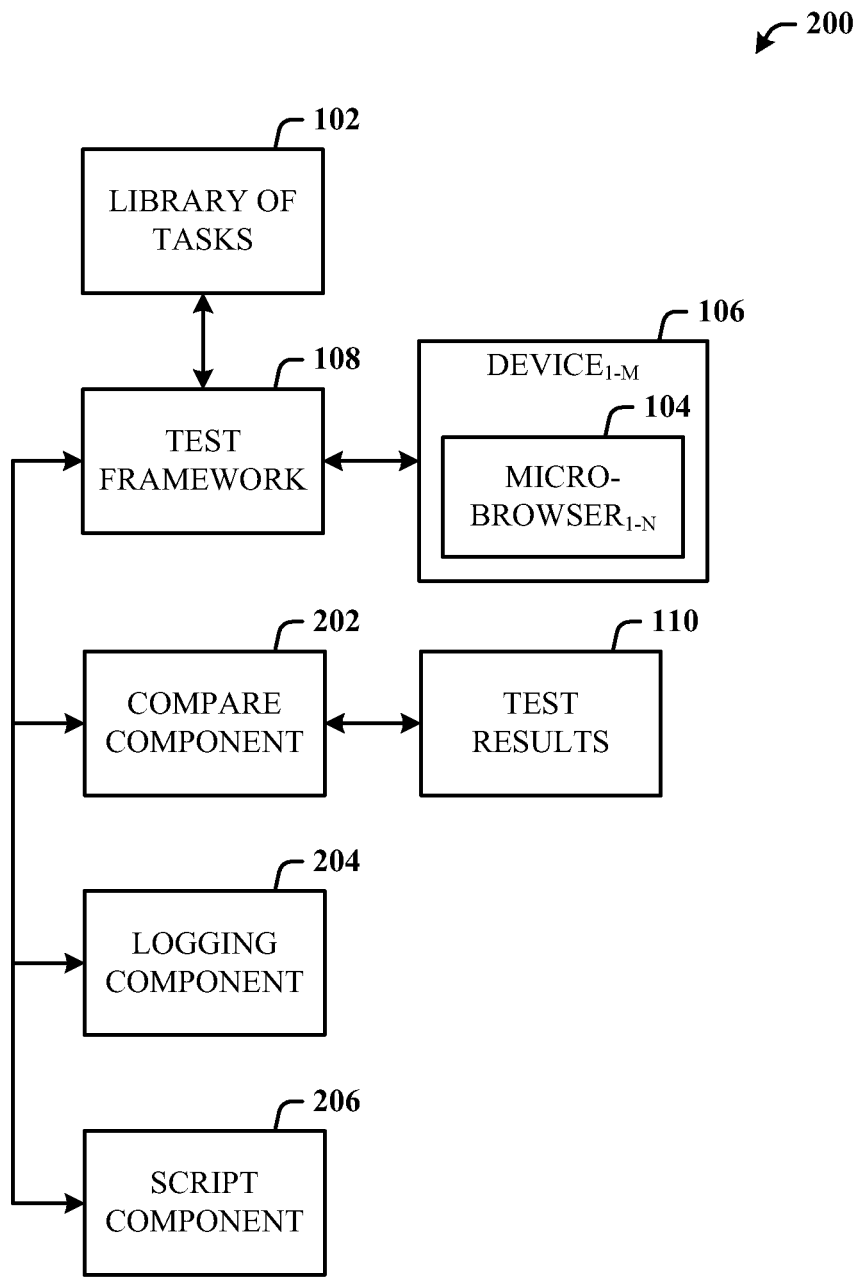
FIG. 2 illustrates an alternative embodiment of a computer-implemented test system.

FIG. 2 illustrates an alternative embodiment of a computer-implemented test system 200. The system 200 includes the library of tasks 102 for controlling different micro-browsers 104 when running on the different handheld web-accessible devices 106 and the test framework 108 for executing the tasks to test display of a webpage in the different micro-browsers 104 when operating on the handheld web-accessible devices 106.

In addition, the system 200 can further include a compare component 202 for comparing display expected results of the webpage to display test results to verify design of the webpage. The compare component 202 trims a screenshot of the webpage prior to comparison. The system 200 can also include a logging component 204 for logging test information and capturing screen dump information. A script component 206 can be employed for writing a test script that accesses one or more tasks of the library 102 to run and control a micro-browser on a particular handheld web-accessible device and test the webpage in the micro-browser of the particular handheld device.

The library of tasks 102 includes one or more methods, micro-browser properties, and device properties defined in the tasks that launch a micro-browser, exit the micro-browser, navigate to a home webpage, navigate to a particular webpage, and navigate back to a previous webpage. Additionally, the library of tasks 102 includes one or more methods, micro-browser properties, and device properties defined in the tasks that reload a webpage, clear a cache, get current information, check a webpage title, and capture a screen.

Figure 3:
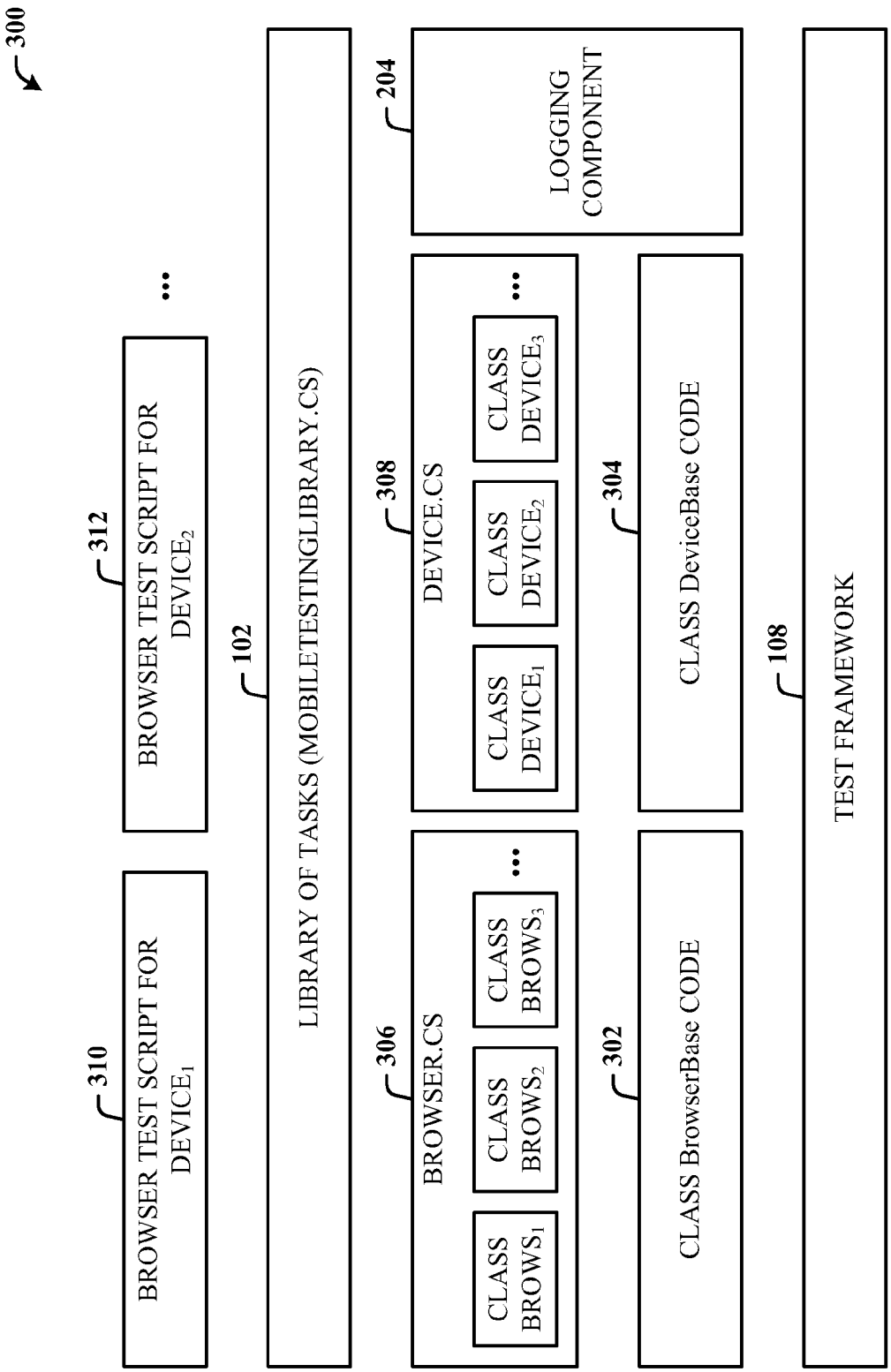
FIG. 3 illustrates test architecture for testing webpage design in micro-browsers running on different handheld devices.

FIG. 3 illustrates test architecture 300 for testing webpage design in micro-browsers running on different handheld devices. The architecture 300 includes the test framework 108 on which all other components operate. For example, the logging component 204 can provide logging of class information as part of the test process. Class information can be related to the different browsers and the different devices. The architecture 300 includes code for BrowserBase class 302 for different kinds of vendor browsers and code for DeviceBase class 304 for different kinds of handheld devices that run the micro-browsers, examples of code which are provided herein below. The BrowserBase class 302 provides users a way to manipulate the operation on a browser and obtain properties of the current active browser object. Similarly, DeviceBase class 304 provides users a way to manipulate the operations on a device and obtain properties of the current device objects.

The BrowserBase class 302 works in cooperation with different browsers defined in a browser object 306. Here, the browser object 306 includes definitions for at least three browsers: Class Brows$_1$, Class Brows$_2$, and Class Brows$_3$. Other browsers can be defined, as well. Similarly, DeviceBase class 304 works in cooperation with different devices defined in a device object 308. Here, the device object 308 includes definitions for at least three devices: Class Device$_1$, Class Device$_2$, and Class Device$_3$. Other devices can be defined, as well.

The library of tasks 102 interfaces to the browser object 306 and device object 308, as well as the logging component 204. One or more scripts can be created and run for testing particular devices. For example, a first script 310 can be created and run for testing the webpage on browsers running on the first device (Device$_1$) and a second script 312 can be created and run for testing the webpage on browsers running on the second device (Device$_2$). Other scripts can be created and executed against other devices, as well.

The library of tasks 102 can include tasks written to support methods which meet the tester's need and assist the tester to author the testing scripts on projects. The testing script performs a test based on the steps the tester writes and the library of tasks 102. In other words, the architecture 300 provides micro-browser properties and device properties, and also provides methods for browsers and devices to perform the actions on the browsers and devices.

Following is an example of a device base class (e.g., DeviceBase 304 of FIG. 3) for devices that can be employed for micro-browser testing on handheld devices (e.g., cell phones, smart phones, PDAs, etc.). The class provides users a way to manipulate the operation on a device and gets properties of the current active device object.

```
public class DeviceBase
{
    #region Common Functions
    public void SendKeys (KeyBoard.Key key)
    public void SendKeys (KeyBoard.Key key, int time)
    public void SendKeys (string keyaction)
    public void SendString(string text)
    public void MouseClick(Point point)
    public static Devices DeviceType
    public string Name
    public Rectangle Dimension
    public int DeviceHeight
    public int DeviceWidth
    public bool IsLandscape
    public bool IsPortrait
    public double HeightMultiplier
    public double WidthMultiplier
    public bool ClickContextMenuButton(string button_name)
    public bool PressSoftkey(string key_name)
    #endregion Common Functions
    #region Virtual Functions
    public virtual void ResetDevice( )
    #endregion Virtual Functions
}
```

Following is an example of a browser base class (e.g., BrowserBase 302 of FIG. 3) that can be employed for micro-browser testing on handheld devices. The class provides users a way to manipulate the operation on a browser and gets properties of the current active browser object.

```
abstract public class BrowserBase
{
    #region Pure Virtual Functions
    abstract public string Name { get;}
    abstract public string Title { get;}
    abstract public string ClassName { get; }
    #endregion Pure Virtual Functions
    #region Common Functions
    public bool CheckPopUpWindow(string title, string classname)
    public bool IsPageTitle(string title)
    #endregion Common Functions
    #region Virtual Functions
    public virtual bool LaunchBrowser( )
    public virtual bool ExitBrowser( )
    public virtual bool GotoHomepage( )
    public virtual bool ClearCache( )
    public virtual void GotoPage(string url)
    public virtual void Reload( ) { }
    public virtual void GetCurrentInfo(out string name, out string address)
    public virtual void Back( ) { }
    public virtual bool CheckPageTitle(string title_load, string title_left)
    public virtual void CaptureScreen(string fileName)
    public virtual void CheckSiteStatus
        (string Url, string FinallyTitle, string Account, string Passwd, bool IsSavePwd, bool IsSaveName)
    #endregion Virtual Functions
}
```

Following is an example of a testing script (e.g., first script 310 of FIG. 3) that can be employed to test a browser named Browser BWP.

```
/// <summary>
/// Browser BWP test
/// </summary>
/// <returns>Log</returns>
[TestCaseAttribute("BWP", Type = TestType.BWP, ID = 1)]
public Log.LogResult BrowserWMBWP( )
```

```
{
    MobileTestingLibrary mtl = new
MobileTestingLibrary(Browsers.Browser);
        mtl.Browser.LaunchBrowser( );
        mtl2.Browser.GotoPage("http://mobile.msn.com");
        mtl2.CaptureScreen("testbrowser.bmp");
        mtl2.Browser.ExitBrowser( );
        return Utils.GlobalLogResultManager.Results.Summary;
}
```

Class logging by the logging component 204 includes logging test information and capturing screen dumps. Capturing the screen dump on a device is used for test result verification. To avoid the false verification and reduce the overhead during image comparison process, the screenshots can be trimmed. For each browser and device, different coordinates can be defined to preserve the webpage content part. The logging component 204 also computes and provides a pass rate of the test cases and identifies the failure case information.

The architecture 300 can also include an image compare class (not shown) for comparing the test webpage image (for the screen capture) to the expected webpage result. Functions for this class can include an image compare method where the filename of a failed test result image is stored in a string array. A process image file method can process the image file of the captured webpage. A process image directory method can process image files under a directory. A computer mask method can convert a color image to grayscale, calculate differences between two grayscale images, and insert the calculation in a mask. A draw contour method can perform dilation, draw contours, stretch the array size to fit the color image, and mask the difference with a color (e.g., red). In other words, after processing, the difference can be circled in the color, which means the screenshot taken by the test case is different from the original correct screenshot by the colored portion.

Figure 4:
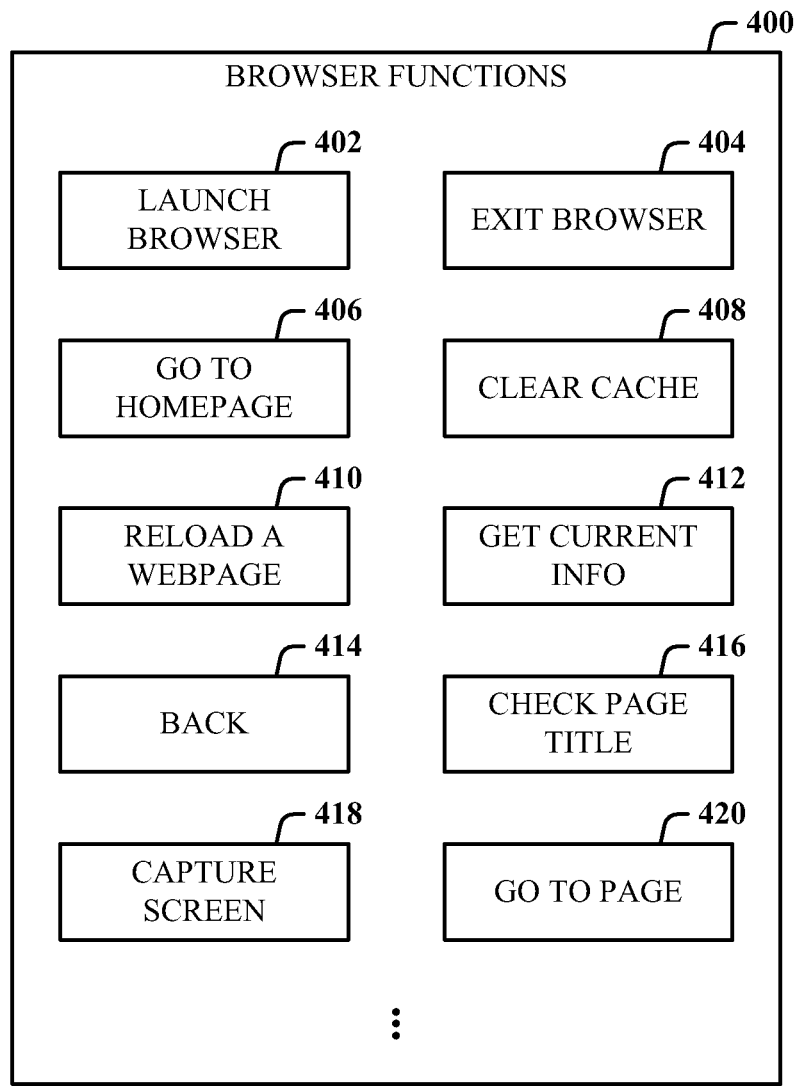
FIG. 4 illustrates a set of browser functions (methods) that can be employed for testing micro-browsers and handheld devices.

FIG. 4 illustrates a set of browser functions 400 (methods) that can be employed for testing micro-browsers and handheld devices. The set of functions 400 can include functions for launching a browser 402, exiting a browser 404, go to a home page 406, clearing a cache 408, navigating to a webpage 410, reloading a webpage 412, getting the current information for a webpage 414, navigating back to a webpage 416, checking a page title 418, and capturing a screen 410, for example.

The launch browser function 402 launches the micro-browser via a menu or program path and returns a value of true if the launch was successful or false for any other event. The exit browser function 404 causes the current browser to exit, and returns a value of true if the exit was successful or false for any other event. The go to a home page function 406 navigates to the homepage of the current active browser, and returns a value of true if the navigation was successful or false for any other event. The clear cache function 408 clears cache files of the current active browser, and returns a value of true if the clear was successful or false for any other event. The reload a webpage function 410 refreshes the current webpage, and returns a value of true if the reload was successful or false for any other event. The get current info function 412 obtains information related to a URL address and window title. The back function 414 navigates back to the previously viewed webpage. The check page title function 416 checks if the webpage currently open will be replaced with a new page. The capture screen function 418 executes a screen capture current screen dump with filename. The go to page function 420 opens a URL via the current active browser.

Other functions can include opening a webpage and checking the title. This function opens a page via a URL, checks the title of the page that will be loaded and the title of the page that will be replaced. Another function can be to open a testing site via a URL and input an account/password, if necessary to open the testing site.

Figure 5:
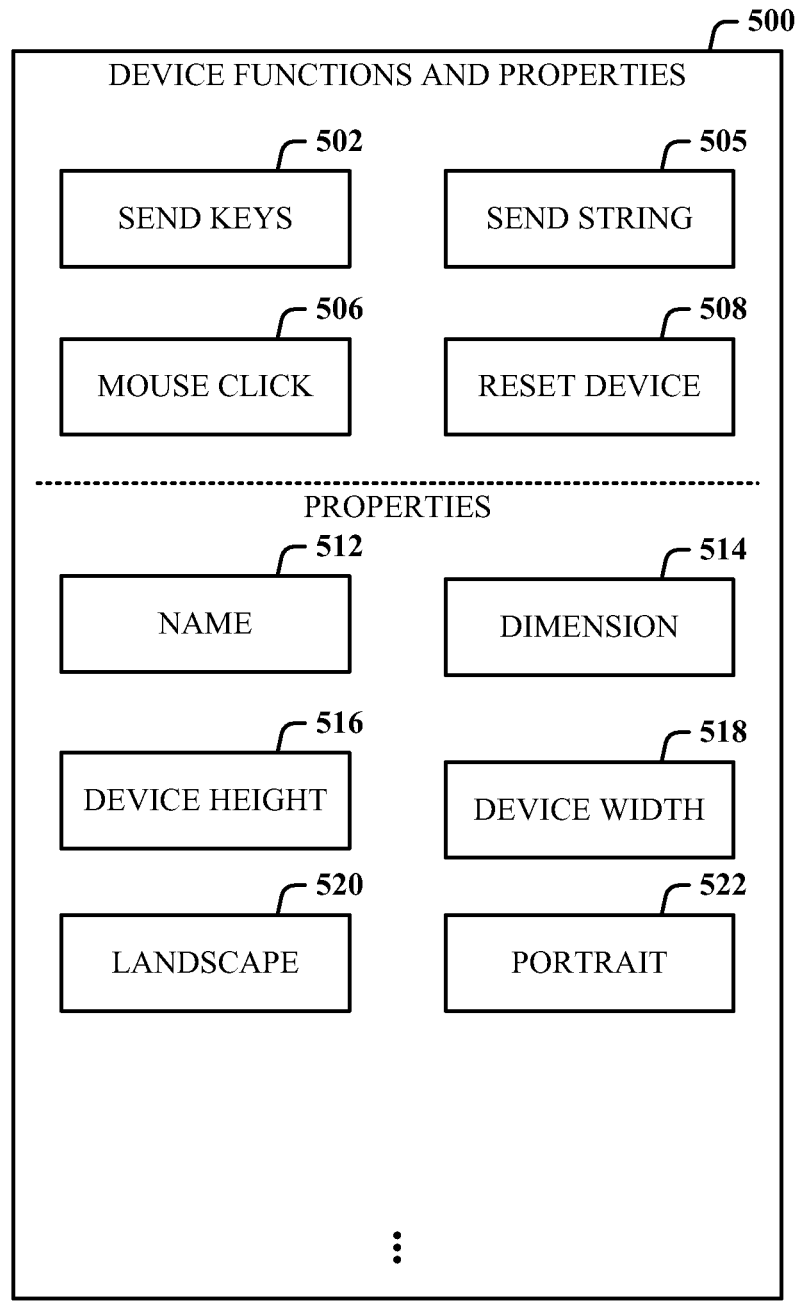
FIG. 5 illustrates a set of device functions (methods) and properties that can be employed for testing micro-browsers and handheld devices.

FIG. 5 illustrates a set of device functions (methods) and properties 500 that can be employed for testing micro-browsers and handheld devices. A sendkeys function 502 sends key activation on the current active device. A sendstring function 504 sends a string on the current active device. A mouseclick function 506 clicks the mouse on a point on the device screen. A resetdevice function 508 resets the current active device settings.

Properties for the device functions and properties 500 can include name 512 (which returns the device name of the current active device), dimension 514 (which returns the dimension of the current active device screen), device height 516 (which returns the height of the current active device screen), device width 518 (which returns the width of the current active device screen), landscape 520 (which returns if the current active device is landscape), and portrait 522 (which returns if the current active device is portrait).

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
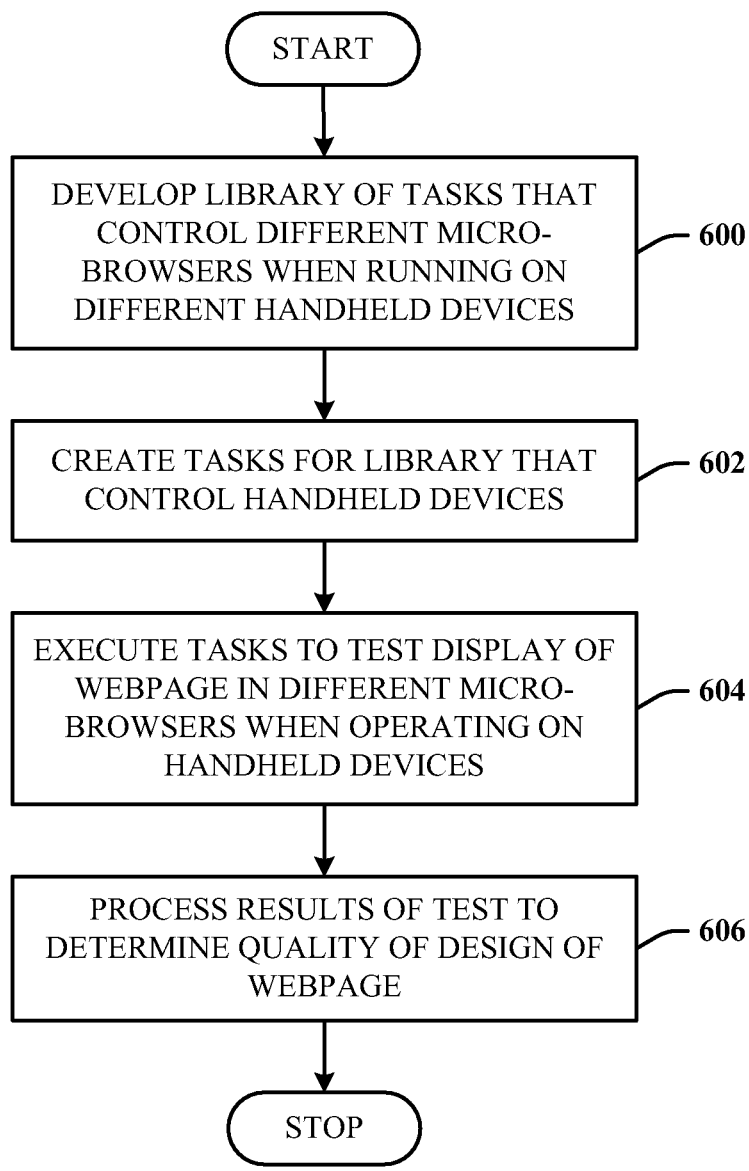
FIG. 6 illustrates a method of testing a webpage.

FIG. 6 illustrates a method of testing a webpage. At 600, a library of tasks is developed that control different micro-browsers when running on different handheld devices. At 602, tasks for the library are created that control the handheld devices. At 604, tasks are executed to test display of a webpage in the different micro-browsers when operating on the handheld devices. At 606, results of the test are processed to determine quality of design of the webpage.

Figure 7:
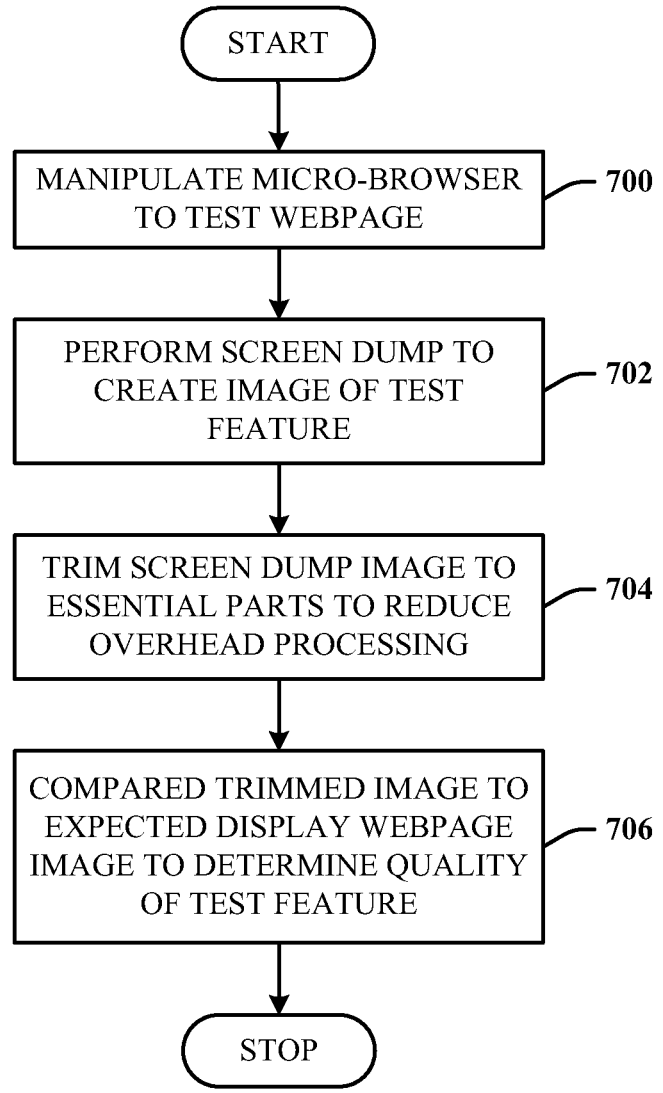
FIG. 7 illustrates a method of using image compare to verify test results.

FIG. 7 illustrates a method of using image compare to verify test results. At 700, a micro-browser is manipulated to test a webpage. At 702, a screen dump is performed to create an image of a test feature. At 704, the screen dump image is trimmed to only the essential image parts (to reduce overhead processing for non-essential image parts). At 706, the trimmed image is compared to an expected display webpage image to determine the quality of the webpage design (e.g., the test feature).

Figure 8A:
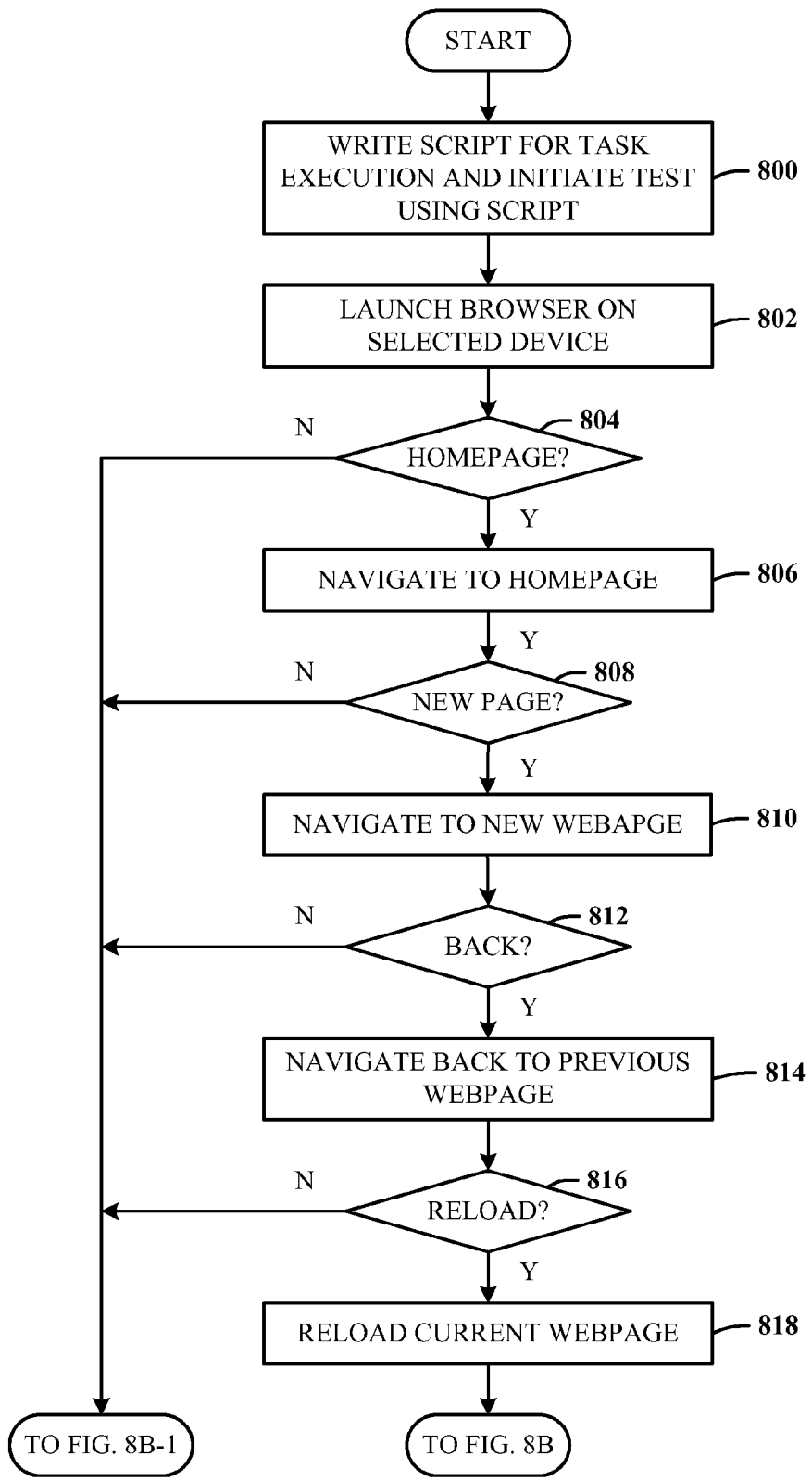
FIG. 8A and FIG. 8B illustrate a method of task execution for testing webpage design on a micro-browser and handheld device.
Figure 8B:
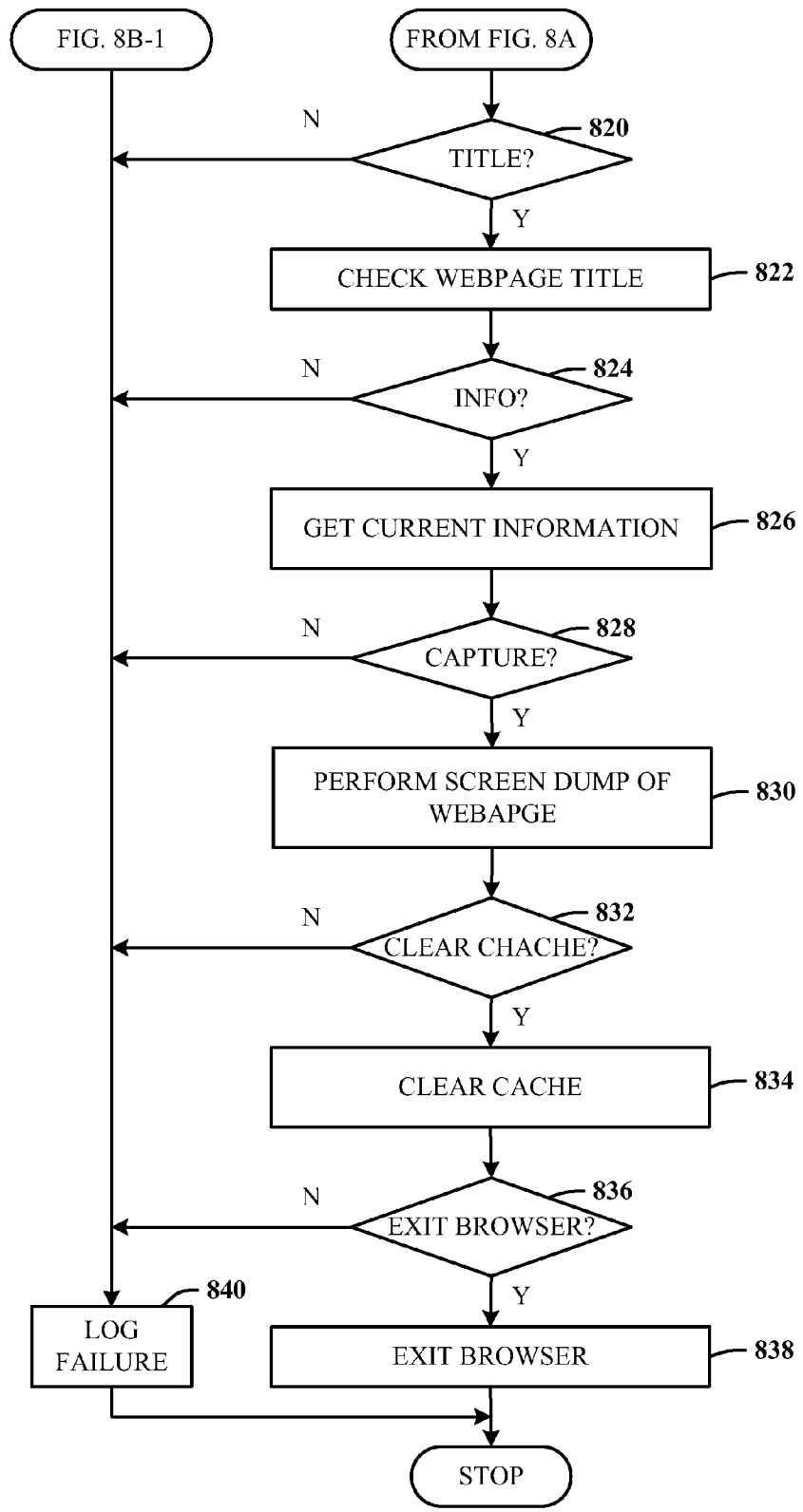

FIG. 8A and FIG. 8B illustrate a method of task execution for testing webpage design on a micro-browser and handheld device. At 800, a script is written for task execution and a test initiated using the script. At 802, a browser is launched on a selected device. At 804, a first task can be to check for homepage navigation. If successful, flow is to 806 to navigate to a homepage. If not successful to navigate to the homepage, flow is from 804 to 840 of FIG. 8B where a failure is logged. Continuing from 806, at 808, a task can be to check for navigation to a new page. If successful, flow is from 808 to 810 to navigate to the new webpage. If not successful to navigate to the new page, flow is from 808 to 840 where a failure is logged. Continuing from 810, at 812, a task can be to check for navigation back to a previous page. If successful, flow is to 814 to navigate back to a previous webpage. If not successful, flow is from 812 to 840 where a failure is logged.

Continuing from 814, at 816, a task can be to check for reload of a webpage. If successful, flow is from 816 to 818 to reload the current webpage. If not successful, flow is from 816 to 840 where a failure is logged. Continuing from 818, at 820 of FIG. 8B, a task can be to check for a webpage title. If successful, flow is from 820 to 822 to check the webpage title. If not successful, flow is from 820 to 840 where a failure is logged. Continuing from 822, at 824, a task can be to check for current webpage information. If successful, flow is to 826 to get the current webpage information. If not successful, flow is from 824 to 840 where a failure is logged. Continuing from 826, at 828, a task can be to check success of performing a screen dump of the webpage. If successful, flow is from 828 to 830 to perform a screen dump of the webpage. If not successful, flow is from 828 to 840 where a failure is logged. Continuing from 830, at 832, a task can be to check clearing of a cache. If successful, flow is from 832 to 834 to clear the cache. If not successful, flow is from 832 to 840 where a failure is logged. Continuing from 834, at 836, a task can be to exit the browser. If successful, flow is to 838 to exit the browser. If not successful, flow is from 836 to 840 where a failure is logged. Other tasks can be provided and tested, as desired. In any case, flow can then be from 838 or 840 to stop the process.

While certain ways of displaying information to users are shown and described with respect to certain figures as screenshots, those skilled in the relevant art will recognize that various other alternatives can be employed. The terms "screen," "screenshot", "webpage," "document", and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 9:
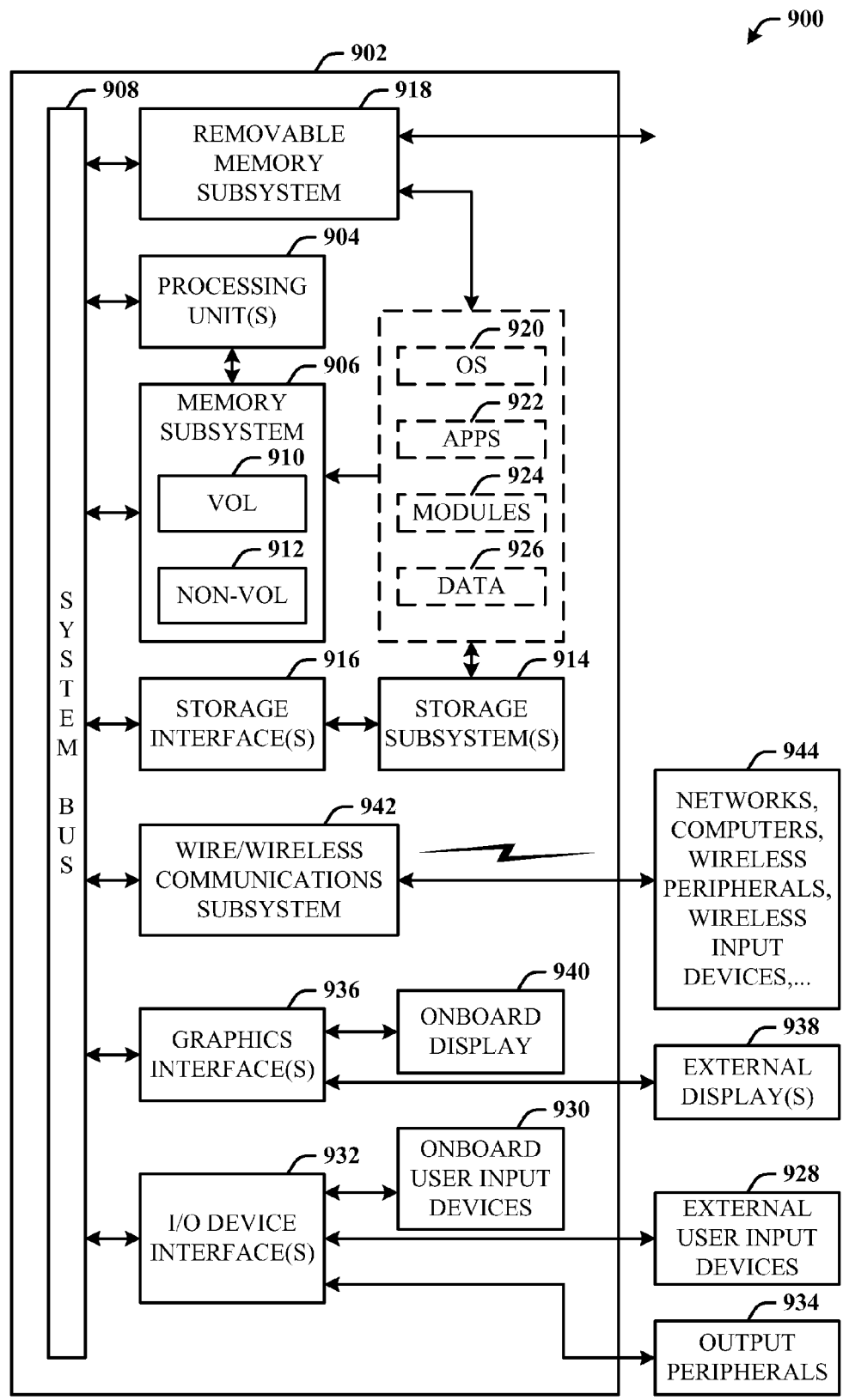
FIG. 9 illustrates a block diagram of a computing system operable to execute webpage testing using a test framework that executes library tasks created for micro-browser and device manipulation in accordance with the disclosed architecture.

Referring now to FIG. 9, there is illustrated a block diagram of a computing system 900 operable to execute webpage testing using a test framework that executes library tasks created for micro-browser and device manipulation in accordance with the disclosed architecture. In order to provide additional context for various aspects thereof, FIG. 9 and the following discussion are intended to provide a brief, general description of the suitable computing system 900 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 900 for implementing various aspects includes the computer 902 having processing unit(s) 904, a system memory 906, and a system bus 908. The processing unit(s) 904 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 906 can include volatile (VOL) memory 910 (e.g., random access memory (RAM)) and non-volatile memory (NON-VOL) 912 (e.g., ROM, EPROM, EEPROM, etc.). A basic input/output system (BIOS) can be stored in the non-volatile memory 912, and includes the basic routines that facilitate the communication of data and signals between components within the computer 902, such as during startup. The volatile memory 910 can also include a high-speed RAM such as static RAM for caching data.

The system bus 908 provides an interface for system components including, but not limited to, the memory subsystem 906 to the processing unit(s) 904. The system bus 908 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 902 further includes storage subsystem(s) 914 and storage interface(s) 916 for interfacing the storage subsystem(s) 914 to the system bus 908 and other desired computer components. The storage subsystem(s) 914 can include one or more of a hard disk drive (HDD), a magnetic floppy disk drive (FDD), and/or optical disk storage drive (e.g., a CD-ROM drive DVD drive), for example. The storage interface(s) 916 can include interface technologies such as EIDE, ATA, SATA, and IEEE 1394, for example.

One or more programs and data can be stored in the memory subsystem 906, a removable memory subsystem 918 (e.g., flash drive form factor technology), and/or the storage subsystem(s) 914, including an operating system 920, one or more application programs 922, other program modules 924, and program data 926. The one or more application programs 922, other program modules 924, and program data 926 can include the system 100 of FIG. 1, the system 200 of FIG. 2, the architecture 300 of FIG. 3, the browser functions of FIG. 4, the device functions and properties 500 of FIG. 5, and the methods of FIGS. 6-8, for example.

Generally, programs include routines, methods, data structures, other software components, etc., that perform particular tasks or implement particular abstract data types. All or portions of the operating system 920, applications 922, modules 924, and/or data 926 can also be cached in memory such as the volatile memory 910, for example. It is to be appreciated that the disclosed architecture can be implemented with various commercially available operating systems or combinations of operating systems (e.g., as virtual machines).

The storage subsystem(s) 914 and memory subsystems (906 and 918) serve as computer readable media for volatile and non-volatile storage of data, data structures, computer-executable instructions, and so forth. Computer readable media can be any available media that can be accessed by the computer 902 and includes volatile and non-volatile media, removable and non-removable media. For the computer 902, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 902, programs, and data using external user input devices 928 such as a keyboard and a mouse. Other external user input devices 928 can include a microphone, an IR (infrared) remote control, a joystick, a game pad, camera recognition systems, a stylus pen, touch screen, gesture systems (e.g., eye movement, head movement, etc.), and/or the like. The user can interact with the computer 902, programs, and data using onboard user input devices 930 such a touchpad, microphone, keyboard, etc., where the computer 902 is a portable computer, for example. These and other input devices are connected to the processing unit(s) 904 through input/output (I/O) device interface(s) 932 via the system bus 908, but can be connected by other interfaces such as a parallel port, IEEE 1394 serial port, a game port, a USB port, an IR interface, etc. The I/O device interface(s) 932 also facilitate the use of output peripherals 934 such as printers, audio devices, camera devices, and so on, such as a sound card and/or onboard audio processing capability.

One or more graphics interface(s) 936 (also commonly referred to as a graphics processing unit (GPU)) provide graphics and video signals between the computer 902 and external display(s) 938 (e.g., LCD, plasma) and/or onboard displays 940 (e.g., for portable computer). The graphics interface(s) 936 can also be manufactured as part of the computer system board.

The computer 902 can operate in a networked environment (e.g., IP) using logical connections via a wire/wireless communications subsystem 942 to one or more networks and/or other computers. The other computers can include workstations, servers, routers, personal computers, microprocessor-based entertainment appliance, a peer device or other common network node, and typically include many or all of the elements described relative to the computer 902. The logical connections can include wire/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 902 connects to the network via a wire/wireless communication subsystem 942 (e.g., a network interface adapter, onboard transceiver subsystem, etc.) to communicate with wire/wireless networks, wire/wireless printers, wire/wireless input devices 944, and so on. The computer 902 can include a modem or has other means for establishing communications over the network. In a networked environment, programs and data relative to the computer 902 can be stored in the remote memory/storage device, as is associated with a distributed system. It will be appreciated that the network connections shown are exemplary and other means of establishing a communications link between the computers can be used.

The computer 902 is operable to communicate with wire/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated aspects can also be practiced in distributed computing environments where certain tasks are performed by remote processing devices that are linked through a communications network. In a distributed computing environment, program modules can be located in local and/or remote storage and/or memory system.

Figure 10:
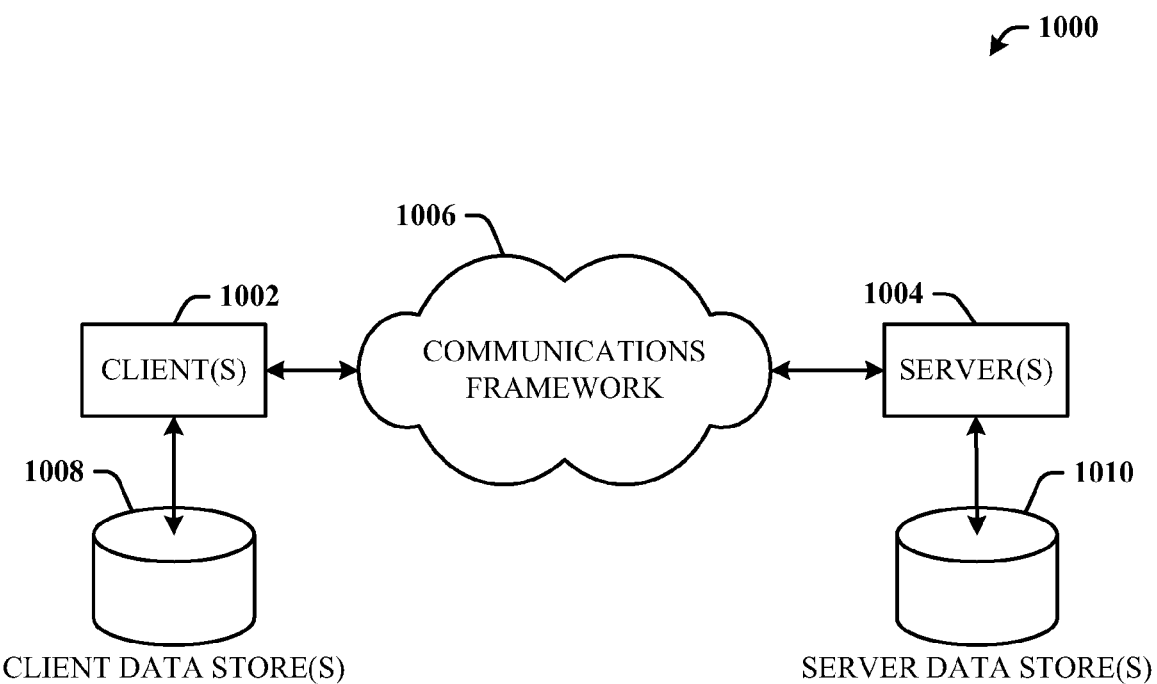
FIG. 10 illustrates a schematic block diagram of a computing environment that executes webpage testing using a test framework that executes library tasks created for micro-browser and device manipulation.

Referring now to FIG. 10, there is illustrated a schematic block diagram of a computing environment 1000 that executes webpage testing using a test framework that executes library tasks created for micro-browser and device manipulation. The environment 1000 includes one or more client(s) 1002. The client(s) 1002 can be hardware and/or software (e.g., threads, processes, computing devices). The client(s) 1002 can house cookie(s) and/or associated contextual information, for example.

The environment 1000 also includes one or more server(s) 1004. The server(s) 1004 can also be hardware and/or software (e.g., threads, processes, computing devices). The servers 1004 can house threads to perform transformations by employing the architecture, for example. One possible communication between a client 1002 and a server 1004 can be in the form of a data packet adapted to be transmitted between two or more computer processes. The data packet may include a cookie and/or associated contextual information, for example. The environment 1000 includes a communication framework 1006 (e.g., a global communication network such as the Internet) that can be employed to facilitate communications between the client(s) 1002 and the server(s) 1004.

Communications can be facilitated via a wire (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented method of testing a webpage, comprising acts of:
developing a library of tasks that control different micro-browsers when running on different handheld devices, the library including micro-browser properties, device properties defined in the tasks, and at least one method that operates the different browsers in a same way, wherein a task defines operations on the micro-browser under test;
creating tasks for the library that control the handheld devices;
executing tasks to test display of a webpage in the different micro-browsers when operating on the handheld devices;
capturing a screenshot image of the display of the webpage, to obtain an image of a test feature;
comparing the image of the test feature to an expected display webpage image;
processing results of the comparing to determine quality of design of the webpage; and
utilizing a microprocessor that executes instructions stored in a memory associated with at least one of the acts of developing, creating, executing, capturing, comparing, or processing.

2. The method of claim 1, further comprising:
capturing a screenshot image by creating a screen dump image of a webpage test result based on a task;
trimming the screenshot image of the screen dump image to obtain the image of the test feature; and
comparing the trimmed screen dump image of the webpage test result to an expected display webpage image to determine the quality of the webpage design.

3. The method of claim 1, further comprising defining coordinates that preserve webpage content during the test.

4. The method of claim 1, further comprising writing a test script that exercises manipulation of a micro-browser on a device when presenting a webpage.

5. The method of claim 1, wherein the tasks executed include launching a browser, navigating to a home webpage, navigating to a different page, navigating back to a previous webpage, reloading a webpage, checking a webpage title, getting current webpage information, capturing a screen of a webpage, clearing a cache, and exiting the browser.

6. A computer-implemented test system, comprising:
a library of tasks configured to enable control of different micro-browsers when running on different handheld web-accessible devices, the library including micro-browser properties, device properties defined in the tasks, and at least one method that operates the different micro-browsers in a same way, wherein a task defines operations on the micro-browser under test;
a test framework configured to execute the tasks to test a display of a webpage in the different micro-browsers when operating on the handheld web-accessible devices;
a logging component configured to capture screen dump information to produce a screenshot image of the display of the webpage, representing a test feature image;
a compare component configured to compare the test feature image to an expected display webpage image; and
a microprocessor configured to execute computer-executable instructions in a memory associated at least with the test framework.

7. The system of claim 6, wherein the compare component compares display expected results of the webpage to display test results to verify design of the webpage.

8. The system of claim 7, wherein the compare component trims the screenshot image of the display of the webpage prior to comparison to obtain the test feature image.

9. The system of claim 6, wherein the logging component logs test information and captures the screen dump information.

10. The system of claim 6, further comprising a script component configured to enable writing a test script that accesses one or more tasks of the library to run a micro-browser on a particular handheld web-accessible device and test the webpage in the micro-browser of the particular handheld device.

11. The system of claim 6, wherein the library includes tasks that launch a micro-browser and exit the micro-browser.

12. The system of claim 6, wherein the library includes tasks that navigate to a home webpage, navigate to a particular webpage, and navigate back to a previous webpage.

13. The system of claim 6, wherein the library includes tasks that reload a webpage and clear a cache.

14. The system of claim 6, wherein the library includes tasks that get current information, check a webpage title, and capture a screen.

15. The system of claim 6, wherein the handheld web-accessible devices include a smart cell phone.

16. A computer-implemented test system, comprising:
a library of tasks configured to enable control of different micro-browsers when running on different handheld web-accessible devices, the library including micro-browser properties, device properties defined in the tasks, and at least one method that operates the different micro-browsers in a same way, wherein a task defines operations on the micro-browser under test;
a test framework configured to execute the tasks to test display of a webpage in the different micro-browsers when operating on the handheld web-accessible devices;
a logging component configured to log test information and capture screen dump information to produce a screenshot image of the webpage, representing a test feature image;
a compare component configured to compare an expected display results image of the webpage to the test display results feature image to verify design of the webpage; and
a microprocessor that executes computer-executable instructions in a memory associated at least with the test framework.

17. The system of claim 16, wherein the compare component trims the screenshot image of the display of the webpage prior to comparison to obtain the test feature image.

18. The system of claim 16, wherein the library includes one or more methods, micro-browser properties, and device properties defined in the tasks that launch a micro-browser, exit the micro-browser, navigate to a home webpage, navigate to a particular webpage, and navigate back to a previous webpage.

19. The system of claim 16, wherein the library includes one or more methods, micro-browser properties, and device properties defined in the tasks that reload a webpage, clear a cache, get current information, check a webpage title, and capture a screen.

20. The system of claim 16, wherein the logging component further computes and provides a pass rate of test cases and identifies failure case information.

* * * * *